(12) United States Patent
Clochard et al.

(10) Patent No.: US 10,399,590 B2
(45) Date of Patent: Sep. 3, 2019

(54) STEERING WHEEL WITH BIFACIAL TRANSPARENT TOUCH-SENSITIVE WALL

(71) Applicants: Continental Automotive France, Toulouse (FR); Continental Automotive GmbH, Hannover (DE)

(72) Inventors: Pascal Clochard, Chevreuse (FR); Philippe Corné, Chatillon (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/077,604

(22) PCT Filed: Feb. 23, 2017

(86) PCT No.: PCT/FR2017/050394
§ 371 (c)(1),
(2) Date: Aug. 13, 2018

(87) PCT Pub. No.: WO2017/144818
PCT Pub. Date: Aug. 31, 2017

(65) Prior Publication Data
US 2019/0047605 A1 Feb. 14, 2019

(30) Foreign Application Priority Data
Feb. 24, 2016 (FR) ...................... 16 51503

(51) Int. Cl.
*B62D 1/04* (2006.01)
*B62D 1/06* (2006.01)
(Continued)

(52) U.S. Cl.
CPC ............... *B62D 1/046* (2013.01); *B62D 1/06* (2013.01); *B60K 2370/1446* (2019.05); *G06F 3/017* (2013.01); *G06F 3/04883* (2013.01)

(58) Field of Classification Search
CPC .... B62D 1/046; B62D 1/06; B60K 270/1446; G06F 3/04883; G06F 3/017
See application file for complete search history.

(56) References Cited

U.S. PATENT DOCUMENTS

| 2014/0062891 A1* | 3/2014 | Powell | .................. B62D 1/046 345/173 |
| 2017/0357361 A1* | 12/2017 | Hong | ...................... B62D 1/00 |
| 2018/0292949 A1* | 10/2018 | Champinot | ............ B60K 37/06 |

FOREIGN PATENT DOCUMENTS

| DE | 102015200907 A1 * | 7/2016 | ............. B62D 1/046 |
| FR | 3031717 A1 | 7/2016 | |

(Continued)

OTHER PUBLICATIONS

International Search Report and Written Opinion for International Application No. PCT/FR2017/050394, dated Apr. 7, 2017—7 pages.

(Continued)

*Primary Examiner* — Patrick Cicchino
(74) *Attorney, Agent, or Firm* — RatnerPrestia (57) ABSTRACT

A steering wheel for a motor vehicle, including at least one translucent touch-sensitive wall, arranged on the inside of the rim of the steering wheel, the touch-sensitive wall having a front surface and a rear surface, the touch-sensitive wall includes a single capacitive detection sheet that is configured to detect the presence and a position of a thumb on the front surface and the presence of at least one other finger on the rear surface.

18 Claims, 5 Drawing Sheets

(51) Int. Cl.
*G06F 3/0488* (2013.01)
*G06F 3/01* (2006.01)

(56) References Cited

FOREIGN PATENT DOCUMENTS

| FR | 3033759 A1 | | 9/2016 |
|----|------------|---|--------|
| JP | 2005008125 A | * | 1/2005 |
| JP | 2005008125 A | | 1/2005 |

OTHER PUBLICATIONS

English Translation of the Written Opinion for International Application PCT/FR2017/050394, dated Apr. 7, 2017—6 pages.

* cited by examiner

STEERING WHEEL WITH BIFACIAL TRANSPARENT TOUCH-SENSITIVE WALL

CROSS REFERENCE TO RELATED APPLICATIONS

This application is the U.S. National Phase Application of PCT International Application No. PCT/FR2017/050394, filed Feb. 23, 2017, which claims priority to French Patent Application No. 1651503, filed Feb. 24, 2016, the contents of such applications being incorporated by reference herein.

FIELD OF THE INVENTION

The present invention relates to systems and methods for detecting commands given by a motor vehicle driver, in particular commands effected by the hands of the driver at the same time as holding the steering wheel.

BACKGROUND OF THE INVENTION

It is already known practice to place control buttons in the spokes of the steering wheel that connect the central portion to the rim of the steering wheel, for example in order to control communication and/or audio functions or even the speed limiting/regulating function.

However, in the context of increasingly elaborate human-machine interfaces, this solution lacks flexibility because the buttons are often dedicated. Thus, touch zones have been provided on the one or more spokes of the steering wheel as an alternative to control buttons. If the driver uses his or her thumb, this gesture may be imprecise or result in unwanted commands; it is more comfortable to use the index finger but the hold on the rim of the steering wheel must be released to do so. However, road safety requires the hands to be kept on the steering wheel or in immediate proximity thereto.

Additionally, the use of translucent touch-sensitive zones with detection from both sides has been proposed, but it turns out that the driver's view therethrough may be substantially affected.

SUMMARY OF THE INVENTION

The inventors have identified a need to improve the available solutions, in particular those using a translucent touchpad.

To this end, a steering wheel for a motor vehicle is proposed, this steering wheel comprising a translucent touch-sensitive wall, arranged on the inside of the rim of the steering wheel, with a front surface and a rear surface, the touch-sensitive wall being noteworthy in that it comprises a single capacitive detection sheet that is configured to detect the presence and a position of a thumb on the front surface and the presence of at least one other finger on the rear surface.

By virtue of such a configuration, the single capacitive detection sheet allows detection from both sides to be provided and does not substantially decrease the view therethrough (a single ITO layer acting as the ground), moreover with a single sheet and hence a single processing unit; this makes it possible to envisage this function at a reasonable cost.

Advantageously, the driver keeps his or her hands on or in immediate proximity to the steering wheel, and may make control gestures with his or her thumb and another finger, i.e. a reasonably localized pinching movement, while keeping good control of the steering wheel.

In various embodiments of the method according to an aspect of the invention, recourse may furthermore potentially be made to any and/or all of the following provisions:

- the capacitive detection sheet comprises a matrix array (matrix grid) formed by N first conductors extending in a first direction and M second conductors extending in a second direction; advantageously, detection by polling/scanning on the principle of transmitting rows-receiving columns is used;
- N and M may preferably be such that $4<N<16$ and $4<M<16$; the advantage lies in the limited number of paths and the lack of need for a large amount of computing power, and sufficiently high polling frequency;
- the capacitive detection sheet may comprise a guard ring; advantageously, a relatively common, often standard device is used to detect the other fingers on the rear surface;
- the capacitive detection sheet is controlled by a processing unit that is connected to the first and second conductors, with specific inputs/outputs for the guard ring; the sensitivity of detection may thus be differentiated between the guard ring and the conductors;
- additionally, the capacitive detection sheet may comprise a second guard ring; this makes it possible to increase the effectiveness of the peripheral detection of the fingers (other than the thumb);
- the presence of at least one other finger on the rear surface is detected by virtue of the guard ring. Advantageously, this device is used to detect the fingers (other than the thumb) on the rear surface;
- the capacitive detection sheet comprises at least one substantially continuous ground track. Advantageously, the ground track takes the form of a screen; this allows selectivity as to the detection side (i.e. detection only opposite the ground track) and additionally enhances robustness in the face of electromagnetic interference attacks;
- as a variant, it is possible to provide an auxiliary ground track taking the general shape of a ring around the first. This will be used in particular for peripheral detection;
- the capacitive detection sheet defines a central detection zone configured to detect the thumb and a peripheral detection zone configured to detect the other finger, the peripheral detection zone surrounding the central detection zone. Thus, advantageously, the detection zone for the front and the detection zone for the rear are arranged substantially in one and the same plane; the touch-sensitive wall thus contains the detection sheet in a single thickness and its thickness may thus be low;
- in the central detection zone, the first conductors are typically located below the second conductors and, in the peripheral detection zone, the second conductors are typically located below the first conductors. Advantageously, the positioning of the central detection zone with respect to the peripheral detection zone is thus simply inverted, while retaining the conventional electronic processing of a simple matrix sheet;
- in the central detection zone, a ground track is interposed between the conductors and the rear surface and, in the peripheral detection zone, another ground track is interposed between the conductors and the front surface. Advantageously, the positioning of the ground tracks is also inverted, in accordance and consistent with the inversion of the relative position of the conductors;
- each of the second conductors has offset end portions, so as to be located as close as possible to the active detection surface. Advantageously, the thickness of the sheet over the entire area thereof is thus optimized;

each touch-sensitive wall is less than 3 mm thick, preferably lies substantially in a plane, said plane being substantially perpendicular to the axis of rotation of the steering wheel. The advantages are unobtrusiveness and ease of use;

each touch-sensitive wall is linked to the rim of the steering wheel, and/or to the hub of the steering wheel and/or to a spoke. The advantages are the flexibility of the solution and the extent of the design possibilities for steering wheels;

the touch-sensitive wall is made of a transparent PMMA-type material and the first and second conductors are less than 0.1 mm in diameter. The advantages are good optical transparency and little interference with regard to the driver's view therethrough;

the ground track of the capacitive sheet may typically be made using an ITO (indium tin oxide)-type coating. The advantages are good optical transparency and little interference with regard to the driver's view therethrough.

BRIEF DESCRIPTION OF THE DRAWINGS

Other aspects, aims and advantages of the invention will become apparent on reading the following description of one of its embodiments, which embodiment is given by way of nonlimiting example. Aspects of the invention will also be better understood in light of the appended drawings, in which.

DETAILED DESCRIPTION OF THE PREFERRED EMBODIMENTS

Figure 1:
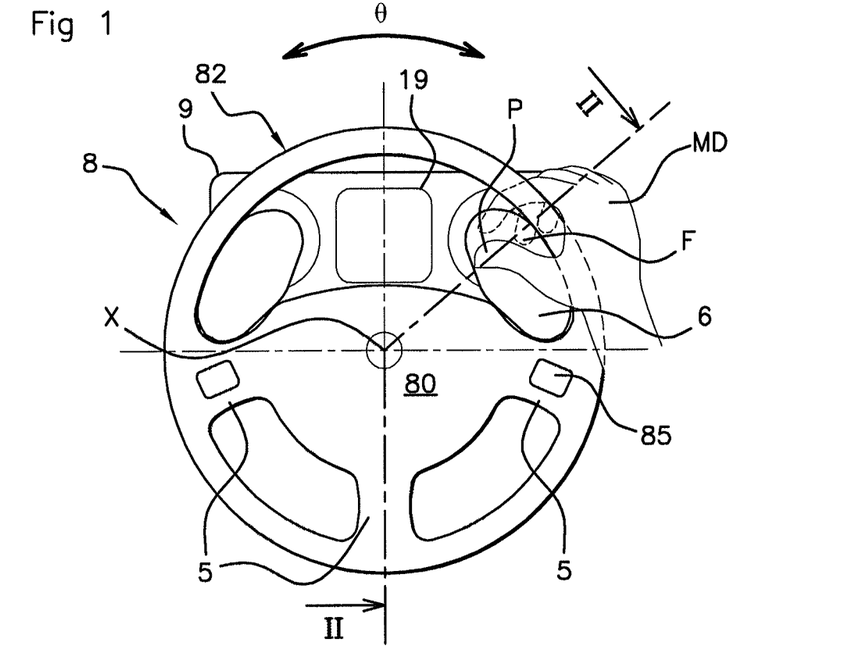
FIG. 1 shows a general schematic, seen face-on, of an automobile driving station.
Figure 2:
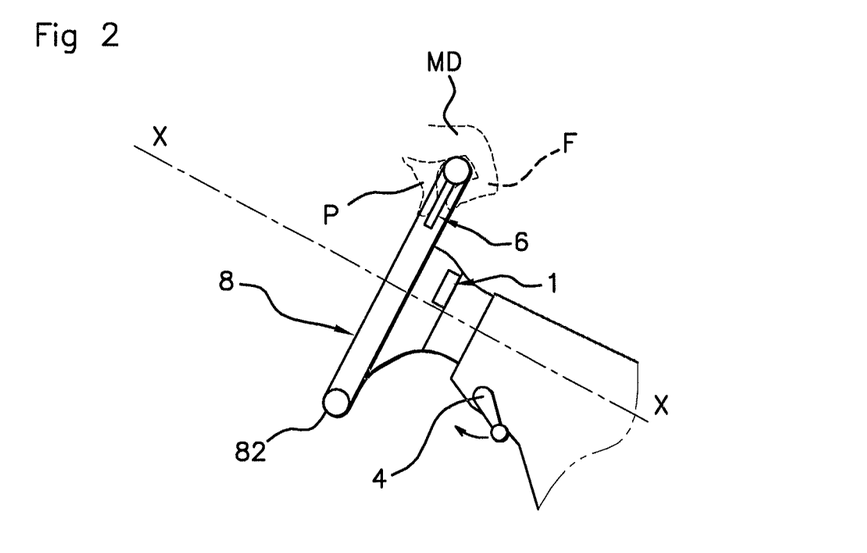
FIG. 2 shows a schematic cross-sectional view of the driving station of FIG. 1, along the line II-II that can be seen in FIG. 1.

FIG. 1 shows the central zone of the driving station from the point of view of the driver (in a situation of driving in a straight line). In the driving station, facing the driver, there is an instrument panel 9 that, in the present case, includes a (or more than one) (LCD or pixelated) digital display zone(s) 19, and a steering wheel 8 for steering the vehicle, the steering wheel 8 being mounted so as to be able to rotate about the axis X (movement referenced by the variable θ) and comprising a rim 82. The instrument panel 9 forms a display device that may furthermore comprise various status lights, indicator lights, and dials, which are known per se.

Moreover, other display devices and other control devices are located in the general field of view of the driver. The driver may be led to interact with a plurality of on-board systems integrated into the vehicle, such as for example the vehicle audio, the air-conditioning, the distance-regulating system, etc.

In the application illustrated here, the steering wheel 8 and the instrument panel 9 serve as a vector for expressing orders and commands that the driver wants to give to various on-board electronic systems.

The steering wheel 8 comprises translucent walls 6, also referred to as "pads". These pads or translucent walls 6 are provided with a touch detection function which will be described in detail below. Reference is therefore made to touch-sensitive translucent walls. They are two in number in the illustrated example, one on the right-hand side and the other on the left-hand side of the steering wheel 8.

In the illustrated example, each touch-sensitive wall 6 preferably lies substantially in a plane, said plane being substantially perpendicular to the axis of rotation X of the steering wheel 6. Each touch-sensitive wall 6 is less than 2 mm thick. Preferably, PMMA or another plastic material exhibiting a high level of transparency without substantial deterioration with ageing is used as the material for these pads.

Figure 5:
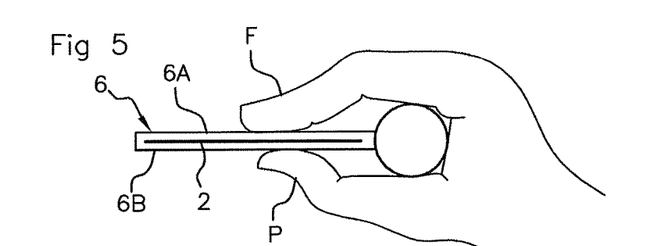
FIG. 5 shows a schematic cross-sectional view of the translucent touch-sensitive wall being touched by the driver's hand.

Each touch-sensitive wall 6 comprises a front surface 6A and a rear surface 6B (cf. FIG. 5). It should be noted that the touch-sensitive wall 6 does not have to be planar and may exhibit a certain degree of curvature.

In addition to conventional buttons, provision is made, by virtue of the touch-sensitive walls 6, for an interface via which the driver may express, using his or her hand (or hands), orders and commands while keeping his or her hands on the steering wheel 8.

To this end, provision is made, in each touch-sensitive wall 6, for a capacitive detection sheet 2.

The capacitive detection sheet 2 (cf. FIG. 6) comprises a matrix array (grid) formed by first conductors 21 extending in a first direction X and second conductors 22 extending in a second direction Y. In the illustrated example, the second direction Y is perpendicular to the first direction X, but it could be otherwise.

Figure 6:
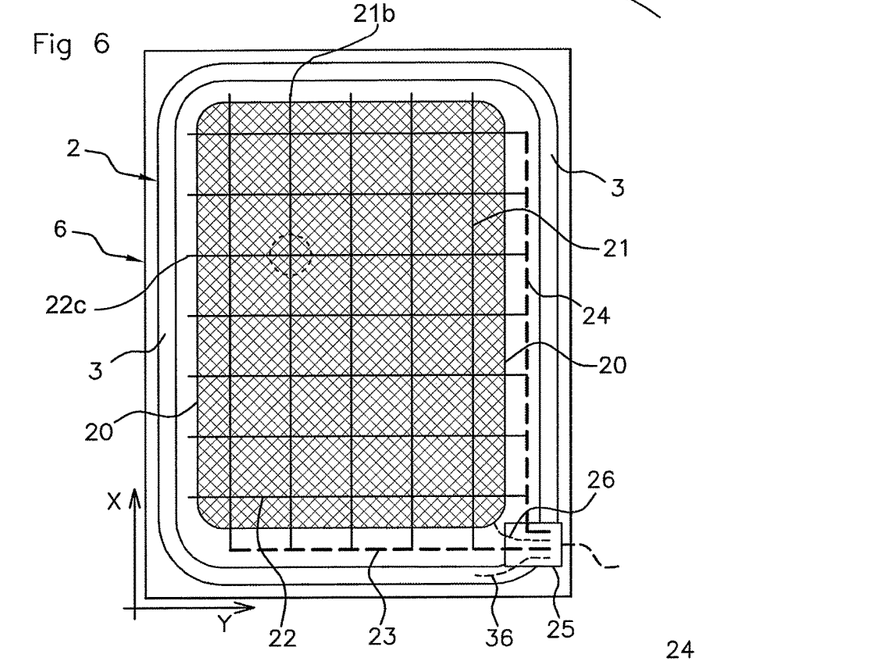
FIG. 6 shows a schematic view face-on of the touch-sensitive wall and of the detection sheet, provided with a guard ring.
Figure 7:
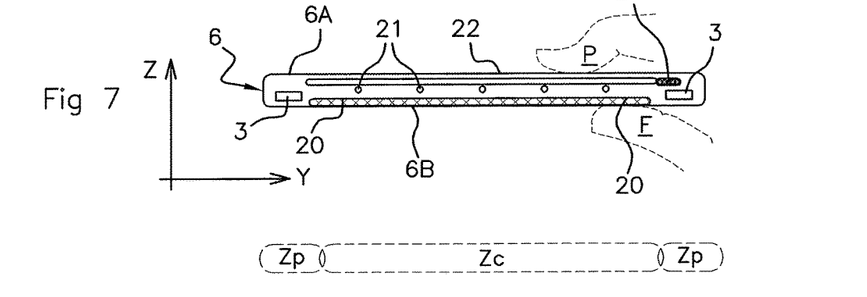
FIG. 7 shows a schematic cross-sectional view of the touch-sensitive wall and of the detection sheet, provided with a guard ring.

The first conductors 21 are parallel to one another (in a sheet) and are N in number; the second conductors 22 are parallel to one another and are M in number. The first conductors 21 cross the second conductors 22 with a very small distance between them, but they do not make electrical contact.

N will typically be comprised between 4 and 16. Similarly, M will typically be comprised between 4 and 16.

Figure 3:
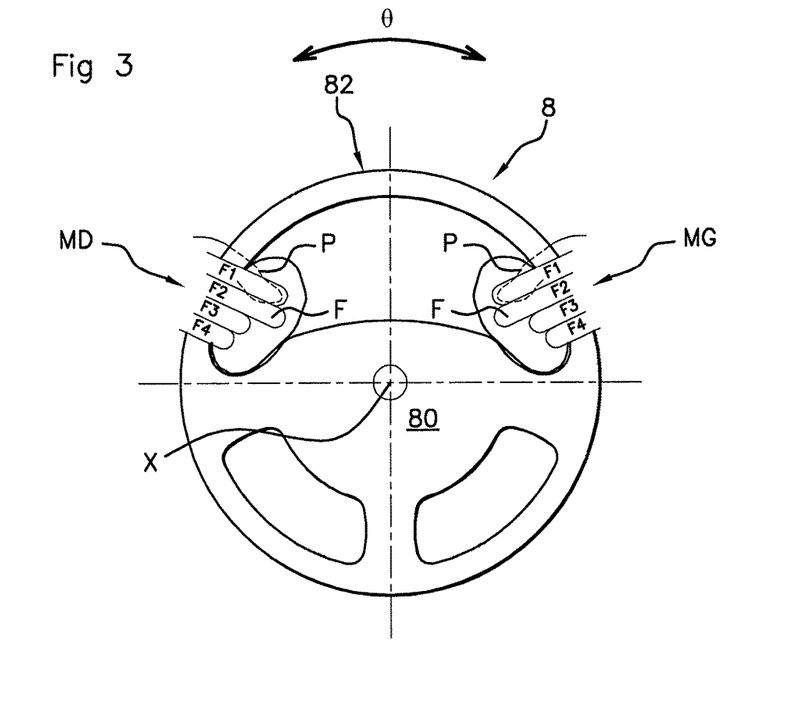
FIG. 3 shows a view of the rear surface of the steering wheel of FIG. 1, with the driver's hands.

The capacitive detection sheet 2 is configured to detect the presence of a position of a thumb (denoted by P) on the front surface and the presence of at least one other finger (denoted by F) on the rear surface. The term "other finger" is understood to mean one or more of the fingers (i.e. other than the thumb) among which: (cf. FIG. 3) the index finger F1, the middle finger F2, the ring finger F3 and the little finger F4.

The other finger F is mainly used to confirm, on the rear surface 6B, a command made using the thumb on the front surface 6A (cf. FIG. 5). The two actions may take place simultaneously or with a very slight time offset.

The detection on the rear surface 6B does not need to be precise; a detection of the overall presence of at least one finger F1, F2, F3, F4 is sufficient.

In the figures, the right hand of the driver is denoted by MD, and the left hand of the driver is denoted by MG.

A processing unit (also referred to as the sheet driver) 1 (cf. FIG. 4) excites the first conductors 21 one after the other (using a frequency signal), and during this time the processing unit 1 monitors the signals received by the second conductors 22. If a finger is in proximity to one of the zones at which the conductors cross, then a capacitive coupling formed at this location transfers a portion of the signal from the first conductor 21 to the second conductor 22.

For example, in FIG. 6, the first conductor 21b (second from the left) is coupled by the presence of the finger with the second conductor 22c (third from the top) and when the excitation scan excites the conductor 21b, a frequency signal passes over to the second conductor 22c and is received by the processing unit 1. This intersection is then considered to have been touched or approached by a finger. This method also works if multiple intersections are contacted simultaneously and regardless of the lighting conditions, including in darkness. This method also works even if the driver is wearing gloves.

When multiple intersections are excited at the same time, the processing unit 1 performs an interpolation to determine the exact position of the center of the finger; a much higher resolution than the size of the mesh of the detection grid is thus obtained.

The scanning frequency of the detection grid is typically higher than 20 Hz, and even preferably higher than 40 Hz, and, as such, the temporal tracking of the presence and positions of the fingers is very precise.

Figure 4:
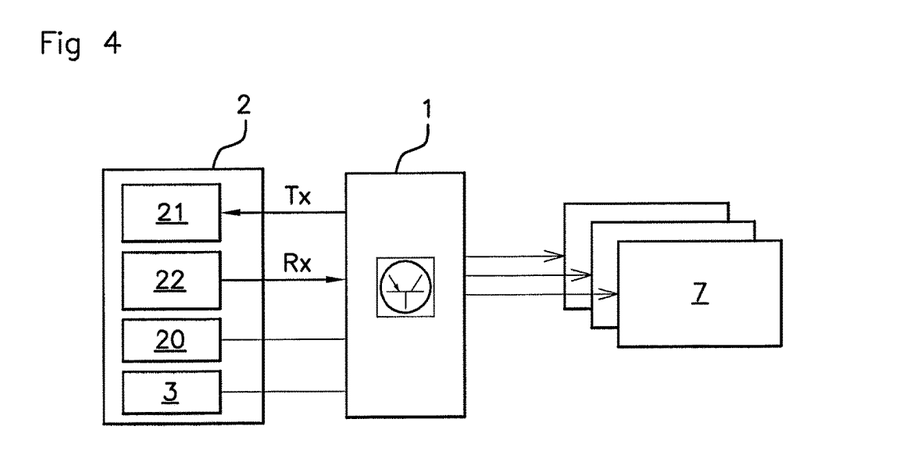
FIG. 4 shows a functional diagram of the system.

The processing operation described above is carried out by the computing unit 1, as illustrated in FIG. 4, the results being made available to other on-board computers 7 in the form of low-level detected commands (movement from point A to point B) or high-level commands (validate, reject).

The information is transmitted either via a rotary contactor or by wireless link of Bluetooth™ or another type.

Depending on the applications, selective detection on one side only may be favored by virtue of a ground track 20 which forms an electrical screen. Said ground track 20 may be substantially continuous under the entire detection grid. According to one solution, said ground track 20 may be formed by an ITO (indium tin oxide) coating layer characterized by its good electrical conductivity and optical transparency.

The ground track 20 also improves the electromagnetic compatibility (EMC), i.e. the robustness in the face of electromagnetic interference attacks and the noiselessness of the scan processing.

According to one optional arrangement, the capacitive detection sheet 2 comprises a guard ring 3. The guard ring 3 is arranged outside the detection grid, in the same plane XY or slightly offset along Z. The detection performed by this guard ring 3 is enough for the low level of precision required for the rear surface detection as mentioned above.

The guard ring 3 may be positioned outside the matrix array of the wires 21, 22, and outside the ground track 20. As a variant, the guard ring 3 may be positioned below the ground track 20 if the latter covers a large area.

The guard ring 3 is advantageously controlled by specific inputs/outputs of the sheet driver; since it is not desired to detect the exact position of an object approaching the guard ring 3, the sensitivity, and hence also the detection distance, may be increased; thus, it is enough for one of the fingers F1, F2, F3, F4 to approach the rear of the transparent touch-sensitive wall 6 to trigger detection via the guard ring 3.

The capacitive detection sheet 2 defines a central detection zone Zc configured to detect the thumb P and a peripheral detection zone Zp configured to detect the other finger F, the peripheral detection zone Zp surrounding the central detection zone Zc.

In the case of the guard ring 3 being present, the peripheral detection zone Zp (active on the rear surface 6B) corresponds to that of the guard ring 3.

In the case of the guard ring 3 being absent (cf. FIGS. 8 and 10), the central Zc (active on the front surface 6A) and peripheral Zp (active on the rear surface 6B) detection zones are formed as follows.

Figure 8:
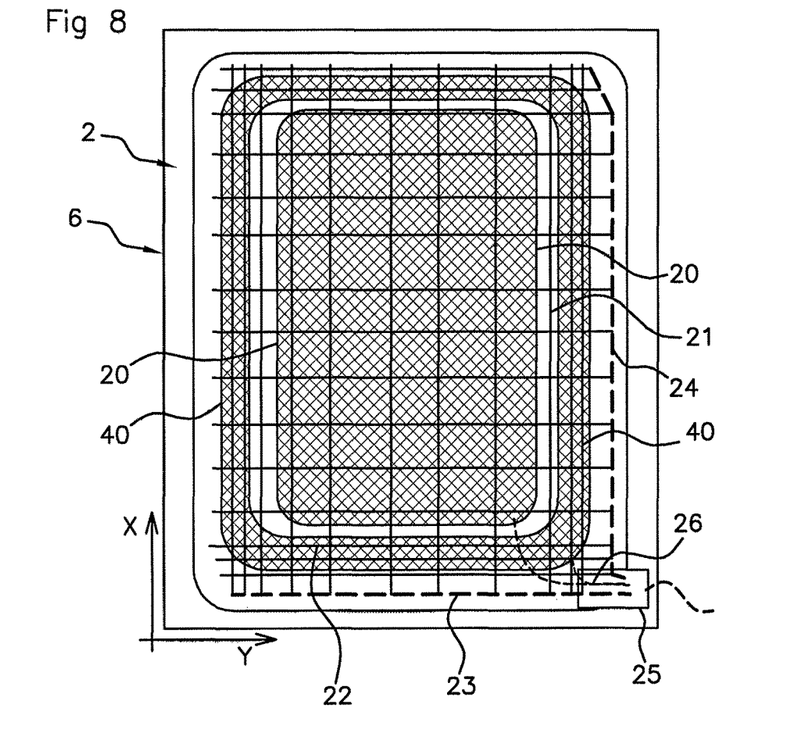
FIG. 8 shows a schematic view face-on of the touch-sensitive wall and the detection sheet.
Figure 10:
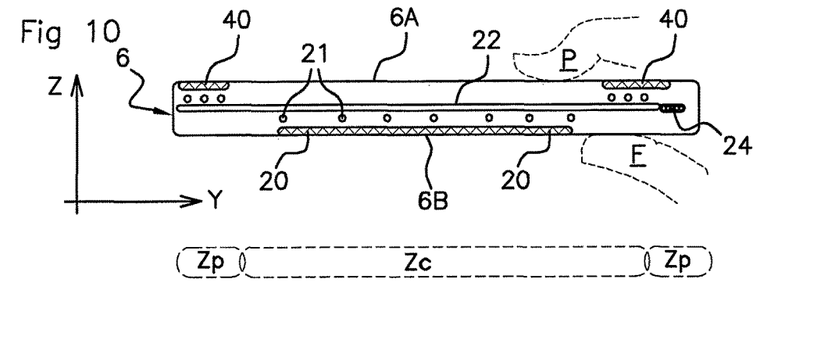
FIG. 10 is analogous to FIG. 12 and shows a variant embodiment.

In the central zone Zc, the first conductors 21 are located below the second conductors 22; detection is active on the front surface 6A; and the ground track 20 is on the rear surface 6B.

In the peripheral detection zone Zp, the arrangement along Z is inverted, i.e. the second conductors 22 are located below the first conductors 21; detection is active on the rear surface 6B and another ground track 40 is on the front surface 6A.

Figure 9:
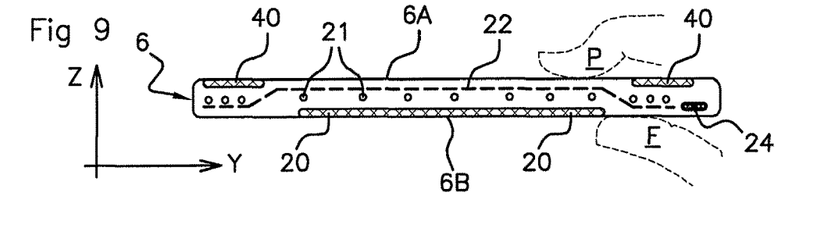
FIG. 9 shows a schematic cross-sectional view of the touch-sensitive wall and of the detection sheet.

Provision may be made for the second conductors 22 to be offset along Z, as illustrated in FIG. 9, which makes it possible to obtain a minimal and uniform thickness for the touch-sensitive wall 6 despite the configurational inversion between the central Zc and peripheral Zp detection zones.

A patch card 25 receives the ends of the respective multiconductor collectors 23, 24 of the first and second conductors 21, 22.

The patch card 25 also receives the links 26, 36 that are respectively linked to the ground track (or tracks) 20, 40 and to the guard ring 3.

It is worth noting that detection is possible from both sides despite there being only one capacitive detection sheet 2, unlike in the prior art in which two detection sheets are required.

It should be noted that, in a driving situation, the hands of the driver may be positioned in a grip position called "9:15" or else a grip position called "10:10"; two-handed but asymmetric positions and single-handed positions are also commonly used by drivers.

It should be noted that the touch-sensitive walls 6 turn along with the rotational movement of the steering wheel by θ, and therefore referenced follow the hands.

It should be noted that the driver is able to see the instrument panel 9 properly through the translucent touch-sensitive walls 6. Specifically, a single ground layer of ITO coating type is located in the thickness of the touch-sensitive wall 6 (unlike in the prior art, in which two are present).

Figure 11:
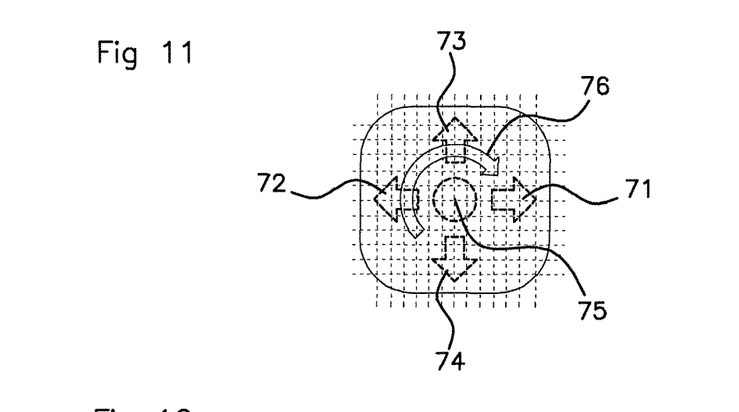
FIG. 11 illustrates a few of the possible movements by the driver's thumb on the touchpad.

In FIG. 11, certain movements of the thumb P are illustrated, such as a movement to the right 71, a movement to the left 72, an upward movement 73, a downward movement 74, pointing 75 and a rotation to the right 76. The simultaneous detection of another finger on the other surface allows potential ambiguities to be removed and some false detections to be avoided.

Figure 13:
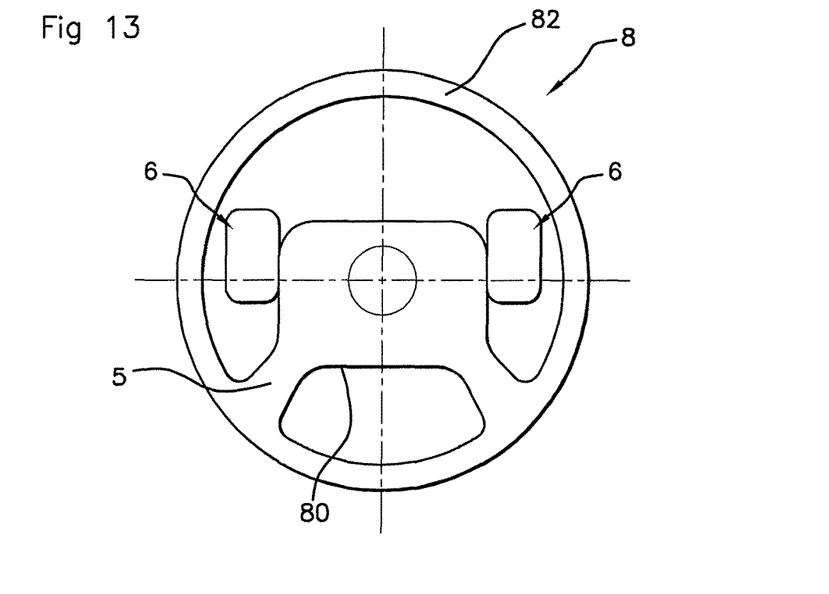
FIG. 13 is analogous to FIG. 1 and shows a variant embodiment of the steering wheel.

The steering wheel 8 comprises a central portion, called the hub 80, and a rim 82, which is connected to the hub by means of three spokes 5 in the illustrated example, however the number of spokes may be four, or indeed two (cf. FIG.

13) or even a single spoke may be used. Provision is made for conventional control buttons 85 on one or more spokes 5.

As illustrated in FIG. 13, the touch-sensitive walls 6 are attached to the hub 80 of the steering wheel 8.

More generally, each touch-sensitive wall 6 may be linked to the rim 82 of the steering wheel 8, and/or to the hub 80 of the steering wheel 8 and/or to a spoke 5.

The attachment and the hold may make use of ribs or stiffeners.

Figure 12:
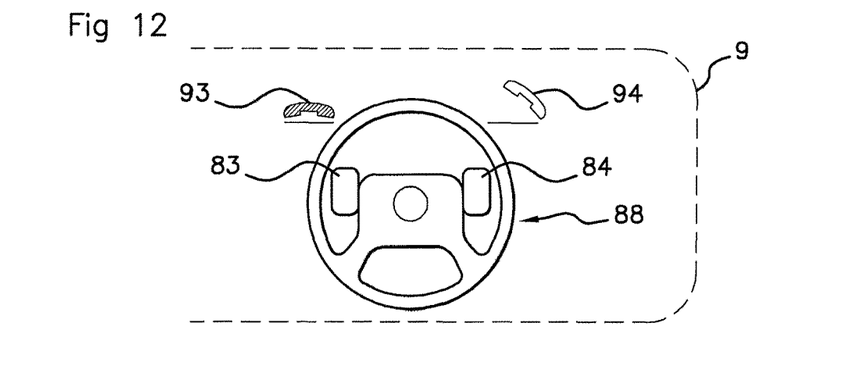
FIG. 12 shows an example of functional use.

By way of application, provision may be made, as illustrated in FIG. 12, to display, on the instrument panel 9, pictograms 88, 93, 94 that are illustrative of the human-machine interface; under certain conditions, a particular gesture, made by the right hand of the driver in the zone referenced 84, leads to a telephone call to be taken, and a particular gesture made by the left hand of the driver in the zone referenced 83 causes the telephone call to be ended.

The invention claimed is:

1. A steering wheel for a motor vehicle, comprising:
   at least one translucent touch-sensitive wall, arranged on an inside of a rim of the steering wheel, the touch-sensitive wall having a front surface and a rear surface, the touch-sensitive wall comprising a single capacitive detection sheet that is configured to detect a presence and a position of a thumb on the front surface and a presence of at least one other finger on the rear surface.

2. The steering wheel as claimed in claim 1, wherein the capacitive detection sheet comprises a matrix array formed by N first conductors extending in a first direction and M second conductors extending in a second direction (Y).

3. The steering wheel as claimed in claim 1, wherein the capacitive detection sheet comprises a guard ring.

4. The steering wheel as claimed in claim 2, wherein the capacitive detection sheet is controlled by a processing unit that is connected to the first and second conductors, with specific inputs/outputs for the guard ring.

5. The steering wheel as claimed in claim 2, wherein the guard ring substantially surrounds the matrix array of the first conductors and second conductors.

6. The steering wheel as claimed in claim 3, wherein the presence of at least one other finger is detected on the rear surface by virtue of the guard ring.

7. The steering wheel as claimed in claim 1, wherein the capacitive detection sheet comprises at least one ground track.

8. The steering wheel as claimed in claim 1, wherein the capacitive detection sheet defines a central detection zone configured to detect the thumb and a peripheral detection zone configured to detect the other finger, the peripheral detection zone surrounding the central detection zone.

9. The steering wheel as claimed in claim 8, wherein, in the central detection zone, the first conductors are located below the second conductors and, in the peripheral detection zone, the second conductors are located below the first conductors.

10. The steering wheel as claimed in claim 9, wherein, in the central detection zone, a ground track is interposed between the conductors and the rear surface and, in the peripheral detection zone, an annular auxiliary ground track is interposed between the conductors and the front surface.

11. The steering wheel as claimed in claim 2, wherein each of the second conductors has end portions that are offset along Z, so as to be located as close as possible to an active detection surface of the detection sheet.

12. The steering wheel as claimed in claim 1, wherein each touch-sensitive wall is less than 3 mm thick, preferably lies substantially in a plane, said plane being substantially perpendicular to the axis of rotation X of the steering wheel.

13. The steering wheel as claimed in claim 1, wherein each touch-sensitive wall is linked to the rim of the steering wheel, and/or to the hub of the steering wheel and/or to a spoke.

14. The steering wheel as claimed in claim 1, wherein the touch-sensitive wall is made of a transparent PMMA-type material and the first and second conductors are less than 0.1 mm in diameter.

15. The steering wheel as claimed in claim 2, wherein the capacitive detection sheet comprises a guard ring.

16. The steering wheel as claimed in claim 3, wherein the capacitive detection sheet is controlled by a processing unit that is connected to the first and second conductors, with specific inputs/outputs for the guard ring.

17. The steering wheel as claimed in claim 3, wherein the guard ring substantially surrounds the matrix array of the first conductors and second conductors.

18. The steering wheel as claimed in claim 9, wherein each of the second conductors has end portions that are offset along Z, so as to be located as close as possible to an active detection surface of the detection sheet.

* * * * *